United States Patent Office 3,216,941
Patented Nov. 9, 1965

3,216,941
ALKYLENE GLYCOL AMINE REACTION PRODUCT
Louis de Vries, Richmond, Calif., assignor to California Research Corporation, San Francisco, Calif., a corporation of Delaware
No Drawing. Filed Mar. 28, 1963, Ser. No. 268,602
8 Claims. (Cl. 252—51.5)

This invention relates to a novel alkylene glycol amine reaction product. More particularly, the invention is concerned with a new alkylene glycol amine reaction product of a succinic acid anhydride substituted high molecular weight unsaturated hydrocarbon polymer.

Alkylene glycol compounds are useful as synthetic oils and as additives for lubricating oils having desirable viscosity-temperature characteristics which permit effective lubrication in spite of wide variations in operating temperatures. Certain alkylene glycol compounds are also useful as dispersants for a variety of compositions, such as paints, fuels, lubricants and the like.

It has now been found that a useful new alkylene glycol compound is provided in the alkylene glycol amine reaction product of a maleic adduct of the copolymer of (A) α-olefins of from about 2 to about 20 carbon atoms and (B) polyolefins of from about 5 to about 20 carbon atoms in which the adducted maleic groups are reacted with the amino group of a glycol amine selected from the class consisting of alkylene glycol amines and polyalkylene glycol amines having alkylene glycol and polyalkylene glycol groups of a molecular weight between about 44 and 30,000 and containing at least one alkylene oxide unit in which each alkylene oxide unit has from 2 to 7 carbon atoms, the amino group being nontertiary and the molar ratio of amine to adducted maleic groups being from about 0.25:1 to 2:1, said copolymer having at least 0.25% by weight of adducted maleic groups, a mole ratio of (A) monomer units to (B) monomer units from about 1:1 to about 400:1 and a molecular weight of from about 10,000 to about 1,000,000.

The alkylene glycol amine derivative of this invention possesses valuable dispersing properties in liquid hydrocarbon compositions, such as fuels and lubricants. When added to lubricating oil compositions, the alkylene glycol amine derivative also improves the viscosity-temperature characteristics of the compositions.

The alkylene glycol amine product of this invention may also be described as the reaction product obtained by heating an alkylene glycol amine with a succinic anhydride substituted copolymer containing (A) monomer units having the general formula

—RCH—CH$_2$— in which R represents hydrogen or an aliphatic essentially hydrocarbon radical of from about 1 to about 18 carbon atoms and mixtures thereof and (B) monomer units having the general formula

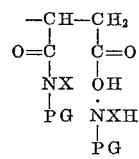

in which U represents an unsaturated aliphatic essentially hydrocarbon radical of from about 2 to about 18 carbon atoms, the ratio of (A) to (B) being from about 1:1 to about 400:1, said copolymer having a molecular weight of from about 10,000 to about 1,000,000, said succinic anhydride groups being reacted with the amino group of an alkylene glycol amine as already defined, preferably a member of the class consisting of polyalkylene glycol amines and alkoxy polyalkylene glycol amines having polyalkylene glycol groups of a molecular weight between about 220 and 30,000 and containing at least five alkylene oxide units in which each alkylene oxide unit has from 2 to 7 carbon atoms, the amino group being nontertiary and the molar ratio of amine to succinic anhydride groups being from about 0.25:1 to 2:1.

The alkylene glycol amine reacts with the succinic anhydride groups or succinic acid groups to form either amine salts, amides or imides or mixtures of such derivatives. Using polyalkylene glycol (PG) amine by way of illustration, the reaction of a substituted succinic anhydride with an alkylene glycol amine leads first to cleavage of the anhydride and formation of an acid amide. The acid moiety may form at the same time an amine salt as shown by the formula

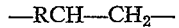
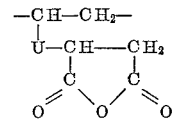

in which X is H, alkyl or PG; PG is [CH$_2$CH$_2$O]$_n$R; and R is H, alkyl or acyl. Additional heating to temperature of 90–200° C. causes elimination of water and formation of N-polyalkylene glycol-substituted imide, if X is H (primary amine). When X is alkyl or PG, the final product is a diamide.

An alternate synthesis route is the hydrolysis of the anhydride to the diacid; the latter, in the presence of amine, is first converted to the amine salt, then, upon moderate heating, to the mono- or diamide, and after heating at higher temperature, to the imide (if the amine is primary).

The amine salts and amides form readily when the succinic acid anhydride substituted copolymer and alkylene glycol amine are mixed together. Heating may be used to accelerate the reaction. In the case of the imide formation, heating is required. Suitable temperatures for this purpose are generally in the range from about 75° C. to about 250° C., preferably from about 90° C. to about 200° C.

The reaction of alkylene glycol amine and succinic acid anhydride substituted copolymer is conveniently carried out at atmospheric pressures, although vacuum or higher pressures may be used to facilitate water removal or the maintenance of higher temperatures. Solvents for the reaction products are conveniently employed to simplify handling of materials and to assist in the control of the reaction conditions. Suitable solvents include the hydrocarbons such as petroleum naphtha fractions and aromatic hydrocarbons.

The alkylene glycol amine reaction products of substituted succinic anhydride copolymers are generally characterized by a mixture of randomly distributed recurring component units having the schematic formula

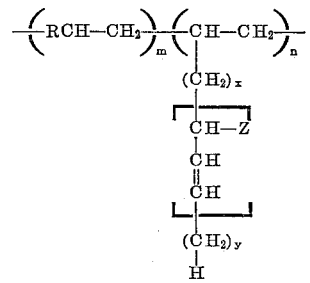

in which Z is an alkylene glycol amine derivative of a succinic acid in which 1 to 2 alkylene glycol amine groups are present as members of the class consisting of amine salts, amides and imides, the alkylene glycol portion of said amine being selected from the class consisting of alkylene glycols, polyalkylene glycols, alkoxy alkylene glycols and alkoxy polyalkylene glycols in which the alkylene glycol group has a molecular weight between about 44 and 30,000 and contains at least one alkylene oxide unit and in which each alkylene oxide unit has from 2 to 7 carbon atoms, R is selected from the class consisting of hydrogen and aliphatic hydrocarbon radicals of from about 1 to about 18 carbon atoms, $x$ is a number from 0 to 15 and $y$ is a number from 0 to 15, the total of $x$ and $y$ being from about 0 to 18, the ratio of $m$ to $n$ being from about 1:1 to about 400:1 and preferably from about 10:1 to about 100:1.

In the compounds of the invention as illustrated by the above and other formulae of this application, the double bond in the bracketed portions may occur either between the succinic group and the polymer backbone or between the succinic group and the end of the pendant hydrocarbon side chain.

The maleic adducting agent as shown in the illustrations of this invention is preferably maleic anhydride. However, other known agents may be used, such as maleic acid, monochloromaleic acid, monochloromaleic anhydride, and the like.

A preferred embodiment of the present invention consists of an oil-soluble polymeric dispersant containing a mixture of randomly distributed recurring component units having the formula

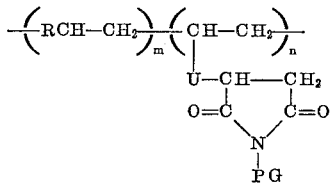

in which U represents an unsaturated aliphatic hydrocarbon radical of from about 4 to about 18 carbon atoms, PG represents a member of the group consisting of polyethylene glycols having a molecular weight of between about 220 and 30,000 and monoalkyl ethers and monoacyl esters thereof and R is hydrogen or an aliphatic hydrocarbon radical of from about 4 to about 18 carbon atoms, the ratio of $m$ to $n$ being from about 10:1 to about 100:1.

High molecular weight maleic anhydride adducts or succinic anhydride substituted hydrocarbon polymers useful in the preparation of the alkylene glycol amine reaction products of this invention may be prepared from a variety of materials by several different methods. However, particularly suitable adducts and their preparation are described in detail in my copending application Serial No. 268,604, filed March 28, 1963. Generally described, such adducts are prepared by heating maleic anhydride together with a copolymer of α-olefins and polyolefins having an unsturated group in the alpha position as already mentioned. In the adduction reaction, the maleic anhydride adds to the unsaturated hydrocarbon radicals which are pendant from the polymer backbone to give succinic anhydride groups. The temperatures of the adduction are ordinarily between about 100° C. and 300° C., preferably 150° C. and 250° C. The copolymer and maleic anhydride are heated together until the adduction is essentially complete as indicated by no further consumption of maleic anhydride. Usually from about 4 to 24 hours is sufficient. If desired the adduction may be carried out by other techniques, for example, by reaction of a chlorinated polymer containing about 1% by weight of chlorine, with maleic anhydride. Residual chlorine or other nonhydrocarbon substituent does not alter the essentially hydrocarbon character of the polymers as needed for oil solubility. On a weight basis the maleic anhydride adducts preferably contain an average of at least 0.25% of the resulting succinic anhydride groups.

The α-olefins in the copolymers contain at least 2 carbon atoms and include ethylene, 1-butene, 3-methyl-1-butene, 1-tetradecene, 1-octadecene, etc. The polyolefins have at least one terminal double bond and contain at least 5 carbon atoms, preferably at least 8, for example, 1,5-hexadiene, 1,9-octadecadiene, 1,4-octadiene, 1,9,12-octadecatriene, etc. Also included are cyclic olefins, such as cyclohexene, dicyclopentadiene, etc. The preferred copolymers are prepared by reacting the olefin mixtures in the presence of Ziegler-Natta type catalysts which have been found capable of providing satisfactory polymerization of α-olefins. Suitable catalysts and other general background for this type of polymerization reaction are described in a report entitled, "Stereospecific Catalysis," beginning at page 93 in the journal, "Chemical Engineering," for April 2, 1962 (McGraw-Hill Publishing Company, New York, N.Y.).

The catalytic polymerization reaction employed in the preparation of the polymers is an addition type polymerization. The exact mechanism is still not known, but it is generally thought that stereospecific catalysts provide controlled propagation of the polymer chain from the monomers. This controlled propagation in the case of the present α-olefin monomer mixture results in a linear hydrocarbon chain having randomly mixed alkyl and alkenyl substituents on alternate carbon atoms as already discussed. For present purposes, the catalyst ordinarily involves the combination of a reducing metal compound with a reducible metal compound.

In the preparation of the copolymers from which the maleic anhydride adducts of the present invention are prepared, the preferred reducing compounds are aluminum compounds of the following formulae

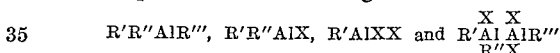

in which the three hydrocarbon radicals, R', R" and R''' which may be the same or different, contain from 1 to 10 carbon atoms each and X's are halogens or mixtures thereof. Illustrative compounds are trimethyl aluminum, triphenyl aluminum, tribenzyl aluminum, phenyldiethyl aluminum, etc. The trialkyl aluminums having 2 to 6 carbon atoms in each alkyl group are most preferred from the standpoint of suitability and availability. The reducible metal compounds of the cocatalyst system used in the preparation of the copolymers is typically a metal of groups IV to VIII of the periodic system of elements, such as titanium, zirconium, vanadium, chromium, molybdenum, etc. Suitable compounds of such metals are the halides, the oxyhalides, the alcoholates, the carboxylic acid salts as illustrated by titanium tetrachloride, vanadium, oxychloride, chromium acetate, etc. The halide compounds are preferred, for example, titanium tetrachloride as well as the complex reaction product containing 3 moles of titanium trichloride to 1 mole of aluminum chloride.

The copolymerization is conveniently carried out at temperatures of from about 30° C. to about 150° C. at atmospheric pressure. The lower temperatures give copolymers of higher molecular weight. A hydrocarbon diluent, such as toluene, xylene, petroleum naphtha or mineral lubricating oil, is commonly employed. The diluent may also serve to some extent as a temperature control under reflux conditions. The reaction time is ordinarily from about 0.5 to 10 hours. When the polymerization reaction is completed to the desired extent, the reaction is stopped by quenching with an alcohol, such as isopropyl alcohol, thus deactivating the polymerization catalyst and incidentally precipitating the copolymer product from the inert hydrocarbon diluent. The copolymers as already mentioned are linear hydrocarbon chains having mixed alkyl and alkenyl substituents on alternate carbon atoms. They have molecular weights of at least about 10,000, preferably from about 50,000 to about 1,000,000 as determined by viscosity measurements and/or standard light scattering methods.

For present purposes, the preferred maleic anhydride adducts are derived from copolymers of cracked wax olefin mixtures of (A) α-olefins of from about 6 to about 20 carbon atoms and (B) diolefins of from about 6 to about 20 carbon atoms. Such cracked wax olefin copolymers are described in detail in my copending application Serial No. 248,212, filed December 31, 1962. The adducts of these copolymers have outstanding properties as lubricating oil additives and are useful in the preparation of still other superior additives for lubricants.

The cracked wax olefin mixtures are suitably prepared by thermal cracking of conventional refined paraffin waxes derived from typical waxy crude oils. Such waxes ordinarily consist of about 90% by weight of normal paraffins containing from about 16 to about 35 carbon atoms. The balance of the wax composition is made up of isoparaffins, naphthenes and small proportions of aromatic hydrocarbons. Thermal cracking which is preferred since it produces high proportions of α-olefins is conveniently carried out by charging the paraffin wax to a reaction zone, such as a hot tube, usually at temperatures of about 500° C. to about 600° C. A few seconds per pass is usually sufficient. Conversions of about 30 to 35% per pass are ordinarily obtained. Atmospheric conditions are preferred, but either pressure or vacuum may be employed if desirable. Diluents such as steam may also be used in the cracking procedure.

The products from the cracking reaction include hydrogen, methane and other hydrocarbons containing as high as 35 carbon atoms. They are effectively separated by conventional means, such as fractional distillation. The lower boiling portion of the products including hydrocarbons of five or fewer carbon atoms may be used as a fuel or in gasoline blending. The portion containing hydrocarbons of more than 20 carbon atoms, if desired, may be recycled for further cracking. The $C_6$ to $C_{20}$ portion may be further fractioned into particular hydrocarbons having carbon contents of $C_{6-7}$, $C_{7-9}$, $C_{9-11}$, $C_{11-15}$, $C_{15-20}$ and the like.

Other paraffin wax charge stocks, cracking conditions and separation procedures of the above-mentioned types are found in descriptions in various publications. The description in U.S. Patent No. 2,172,228 on "Process for the Manufacture of Olefins," is illustrative.

The analysis of a typical cracked wax olefin mixture indicates the following distribution of products:

| | Percent |
|---|---|
| Straight chain α-olefins | 89 |
| Straight chain α,ω-diolefins | 5 |
| Straight chain α-internal polyolefins | 1 |
| Branched-chain and naphthenic hydrocarbons | 3 |
| Conjugated internal diolefins, etc. | 2 |

The alkylene glycol amines are nontertiary amines generally characterized by the formulae $$HN(PG)_2 \text{ and } H_2NPG$$

where "PG" is alkylene glycol or polyalkylene glycol. As illustrated by the formulae, there is always at least one hydrogen group and one alkylene glycol or polyalkylene glycol group present. Such alkylene glycol amines and polyalkylene glycol amines are generally known to the art. Alkylene glycol amines, or alkanol amines as they are also termed, result from the reaction of an alkylene oxide and ammonia, as in the reaction of ethylene oxide and ammonia to give ethanol amine or diethanolamine. The polyalkylene glycol amines are suitably prepared by reaction of alkylene oxide with alkylene glycol amine or alkanol amine. For example, ethylene oxide is reacted with ethanol amine to give polyethylene glycol amine. Suitable alkanol amines for this purpose include ethanol amine, butanol amine, diethanol amine, etc.

The alkoxy and acyloxy polyalkylene glycol amines may be preferred for many purposes, since the alkoxy and acyloxy terminal groups diminish the possibility of side reactions. Terminally substituted polyalkylene glycol amines of these types are suitably prepared in general by ammonolysis of the tosylate ester of the alkoxy or acyloxy type polyalkylene glycol. Such alkoxy and acyloxy terminal substituted polyalkylene glycol amines and the method of preparing them are specifically covered in my copending application Serial No. 268,601 filed March 28, 1963.

Briefly described, the alkoxy or other substituted polyalkylene glycol is reacted with paratoluene sulfonic acid or paratoluene sulfonyl chloride to form the tosylate ester, which is then reacted with an excess of ammonia to form the alkoxy polyalkylene glycol amine salt of the paratoluene sulfonic acid. The salt is then cleaved by reaction with an alkaline material, such as potassium carbonate, to give the polyalkylene glycol amine and alkali metal salt of paratoluene sulfonic acid.

The following polyalkylene glycol groups containing from 2 to 7 carbon atoms in each alkylene group are illustrative of the types described above:

$L-(CH_2-CH_2-O)_5-OC_2H_5$ $L-(CH_2-CH_2-O)_7-CH_2CH_2N(C_2H_5)_2$ $L-(CH_2-CH_2-O)_9\overset{O}{\underset{\parallel}{C}}CH_3$ $L-[CH(CH_3)CH_2-O]_5-C_6H_5$ $L-[CH(CH_3)CH_2-O]_7-SC_{12}H_{25}$ $L-[CH_2-CH_2-O-CH(CH_3)CH_2-O]_5-H$ $L-(CH_2-CH_2-O)_9CH_3$ $L-(CH_2-CH_2-O)_{13}-C_8H_{17}$ $L-(CH_2-CH_2-O)_{13}-C_{12}H_{25}$ $L-(CH_2-CH_2-O)_{13}-C_{18}H_{37}$ $L-[CH_2-(CH_3)CHO]_{30}H$ $L-(CH_2-CH_2-CH_2O)_{40}H$ $L-C_5H_{10}OH$ $L-(C_2H_4OH)_2$ Amines of polyethylene glycol mixtures having average molecular weights of 220, 400, 1000, 1540, 2000 or 10,000 and monoalkyl ethers thereof.

Amines of poly-1,2-propylene glycol mixtures having average molecular weights of 425, 1025 or 10,000 and monoalkyl ethers thereof.

In the above polyalkylene glycol groups, L is the linking amino group which contains either 1 or 2 hydrogen atoms. Where there is only one hydrogen atom, the other valence may be satisfied by a polyalkylene glycol group of the above type or another organic group, such as an alkyl group or an aryl hydrocarbon group.

In the ultimate alkylene glycol amine reaction product, satisfactory oil solubility and detergency are generally obtained when the alkylene glycol portion constitutes at least about 0.1 weight per cent preferably from about 4 to 50 weight percent, of the reaction product. Other polar groups, such an aminoalkylene groups, in addition to the polyalkylene glycol may be present in amounts up to about 10% by weight, if desired, to provide supplementary characteristics.

Further illustrations of the preparation of the alkylene glycol amine reaction products of this invention are given in the following examples. The proportions are on a weight basis unless otherwise specified.

*Example 1*

A methoxy polyethylene glycol primary amine in which the polyethylene glycol has a molecular weight of about 550 is prepared. 2200 g. of methoxy polyethylene glycol (550 mol. wt.) is dried by azeotroping with benzene and dissolved in 1900 cc. tetrahydrofuran (dried by distilling over lithium aluminum hydride). Under exclusion of moisture, 235 g. of a 51% sodium hydride suspension in oil is slowly added and the mixture refluxed 18 hours, cooled, and centrifuged. The neutralization equivalent of the product is 595. The clear tetrahydrofuran solution of the sodium alcoholate is added to a solution of 1360 g. p-toluene-sulfonyl chloride in 1300 cc. dry tetrahydrofuran with external ice cooling at such a rate that the temperature never exceeds 68° F. The mixture is stirred overnight at ambient temperature, then transferred to a pressure vessel purged with dry nitrogen; there are added 2000 g. of dry ammonia and the sealed vessel is heated 5 hours at 130° F. Then, the ammonia in excess is allowed to evaporate, the reaction mixture is stripped of most of the solvent, cooled, and treated with ice water until no more precipitation occurs. It is then filtered, and the clear filtrate saturated with $K_2CO_3$. The water layer is discarded and the organic phase azeotroped to dryness with benzene, filtered, and stripped. The final product has a neutralization equivalent of about 550 and an acetyl equivalent of about 600 which correspond to the theoretical for the methoxy polyethylene glycol primary amine.

*Example 2*

A maleic anhydride adduct is prepared from the copolymer of a synthetic mixture of 1-dodecene and 1,9-octadecadiene in 15:1 molar ratio having a molecular weight of about 300,000. 25 g. of the copolymer in 60 g. of cetane is heated for about 24 hours at a temperature of about 215° C. with 10 g. of maleic anhydride and 0.5 g. of bis(dibutylhydroxyphenyl)methane. The polymer is precipitated with acetone and redissolved in benzene four times. The infrared absorbance for succinic anhydride groups at 1760 cm.$^{-1}$ indicates an anhydride equivalent of about 4100 which corresponds to an approximate ratio of pendant alkyl groups to pendant alkenyl succinic anhydride of 22:1. The "anhydride equivalent" is the number of grams of polymer which combine with 98 g. of maleic anhydride.

25 g. of the maleic anhydride adduct is dissolved in 75 g. of an aromatic hydrocarbon mixture boiling about 170–200° C. The solution is then heated for about 24 hours with 6 g. of methoxy polyethylene glycol primary amine in which the polyethylene glycol has a molecular weight of about 425 (2.3 theories). The heating is carried out at about 170° C. The methoxy polyethylene glycol succinimide is formed as the reaction product. The product is precipitated four times with acetone.

A lubricating oil composition containing 2.8% by weight of the methoxy polyethylene glycol succinimide in 150 neutral oil is prepared. This oil is a conventional solvent-refined California paraffin base mineral lubricating oil having a viscosity of 150 SSU at 100° F. and a viscosity index of about 85. The viscosity index of the oil containing the succinimide is raised to about 140, showing a marked improvement of the viscosity-temperature characteristics of the base oil.

*Example 3*

Approximately 200 g. of cracked wax olefins and 100 g. of xylene is charged to a 2-liter, 3-necked reaction flask equipped with addition funnel and mechanical stirrer. The cracked wax olefin mixture consists of unsaturated aliphatic hydrocarbons containing from about 11 to about 15 carbon atoms of which about 89% is α-olefin and about 6% diolefin containing a terminal double bond. The charge is heated to about 135° C. and blown with nitrogen to remove dissolved oxygen. A cocatalyst mixture consisting of 2.8 g. of titanium trichloride-aluminum chloride complex (Anderson Chemicals ARA $TiCl_3$ AA) and 3.9 ml. of triisobutyl aluminum in 50 ml. of xylene is fed to the reaction flask. The addition of co-catalyst is controlled to maintain a reaction temperature of approximately 135° C. After about 3 hours, 40 ml. of ethanolamine is added to quench the reaction and the polymeric product is precipitated by the addition of methanol. The copolymer has a molecular weight of about 300,000.

The maleic anhydride adduct of the cracked wax olefin copolymer is prepared as outlined above. The infrared absorbance for succinic anhydride groups at 1760 cm.$^{-1}$ indicates an anhydride equivalent of about 6800, which corresponds to an approximate ratio of pendant alkyl groups to pendant alkenyl succinic anhydride of 40:1.

Using the procedure of the previous example, the maleic anhydride adduct of cracked wax olefin copolymer is heated with acetyloxy polyethylene glycol primary amine in which the polyethylene glycol has a molecular weight of about 1000 to give the acetyloxy polyethylene glycol succinimide substituted cracked wax olefin copolymer. A 2.5% by weight solution of the succinimide in 150 neutral oil gives excellent dispersant properties as shown by the test data below.

The chemical and physical characteristics of a variety of alkylene glycol amine reaction products which are prepared in accordance with the above examples illustrative of the invention are summarized in the following table. The viscosity index and piston varnish rating are obtained on the basis of typical lubricant compositions employing the given amount of additive in 150 neutral oil. The base lubricating oil also contains a small amount of about 15 min./kg. zinc butyl hexyl dithiophosphate, a conventional oxidation inhibitor. The base oil without alkylene glycol amine reaction product has a piston varnish rating of 3.5.

The piston varnish ratings of the lubricant compositions are obtained by the standard FL–2 test procedure as set out in the June 21, 1948, report of the Coordinating Research Council. In this test the lubricants are run in a 6-cylinder Chevrolet engine, using a low-grade gasoline especially prone to cause engine deposits. At the end of each test the engine is dismantled and the detergency or deposition properties of the lubricant compositions are determined by examining the engine deposits on the piston and visually rating them as to the amount of piston varnish present. The piston varnish ratings of the compositions are given in numerical terms on a scale of 0.10 with "10" representing the complete absence of deposits.

TABLE I

| Ex. No. | Copolymer of Monomers | Monomer Ratio | Adduct Ratio | Mol. Wt. | Polyalkylene Glycol Amine | Linkage Group | Amt., percent by Wt. | V.I. | Piston Varnish |
|---|---|---|---|---|---|---|---|---|---|
| 3 | Cracked wax olefins ($C_{11}$–$C_{15}$). | 90% α-olefin, 6% polyolefin. | 40/1 | 300,000 | Acetyl Ester of PEG [1] (1,000 mol. wt.) amine. | Imide | 2.5 | | 8.5 |
| 4 | Dodecene/1,9-octadecadiene. | 25/1 | 32/1 | 300,000 | MPEG [2] (425 mol. wt.) amine. | ___do___ | 2.8 | 136 | |
| 5 | ___do___ | 25/1 | 32/1 | 300,000 | MPEG [2] (550 mol. wt.) amine. | ___do___ | 2.5 | 136 | 8.2 |
| 6 | ___do___ | 50/1 | 63/1 | 300,000 | MPEG [2] (425 mol. wt.) amine. | ___do___ | 2.8 | 136 | |
| 7 | ___do___ | 90/1 | 123/1 | 300,000 | ___do [2]___ | ___do___ | 2.8 | 135 | |
| 8 | Cracked wax olefins ($C_{11}$–$C_{15}$). | 90% α-olefin, 6% polyolefin. | 40/1 | 300,000 | MPEG [2] (550 mol. wt.) amine. | ___do___ | 2.5 | 138 | 6.9 |
| 9 | ___do___ | ___do___ | 30/1 | 300,000 | ___do___ | ___do___ | 2.5 | 138 | 9.2 |
| 10 | ___do___ | ___do___ | 40/1 | 300,000 | MPEG [2] (750 mol. wt.) amine. | ___do___ | 1.0 | | 8.9 |
| 11 | ___do___ | ___do___ | 23/1 | 300,000 | MPEG [2] (408 mol. wt.) amine. | ___do___ | 2.5 | 144 | 9.7 |
| 12 | ___do___ | ___do___ | 23/1 | 300,000 | MPEG [2] (246 mol. wt.) amine. | ___do___ | 2.8 | 143 | |

[1] Polyethylene glycol.
[2] Methoxy ployethylene glycol.

As shown by the above characteristics, the alkylene glycol amine reaction products of the invention when added to hydrocarbon compositions, such as mineral lubricating oils, provide excellent viscosity-temperature properties. They are also remarkably effective as dispersants for the prevention of harmful engine deposits as indicated by the improvement in piston varnish rating.

The polyethylene glycol amine products of this invention are oil soluble. This is intended to mean that they are soluble in conventional mineral lubricating oils and other oil compositions such as fuels in a concentration of as the reaction product of pinene and $P_2S_5$, the reaction product of polybutene and $P_2S_5$, and the bivalent metal dihydrocarbon dithiophosphates, zinc butyl amyl dithiophosphate and zinc di-(tetradecylphenyl) dithiophosphate. Metal salt detergents in amounts from about 0.1 to 10% which may also be used are the calcium petroleum sulfonates of the oil-soluble mahogany type and the calcium naphthenates.

Additional examples of alkylene glycol amine reaction products in accordance with the invention are set out in the following table.

TABLE II

| Ex. No. | Copolymer of Monomers | Monomer Ratio | Adducting Agent | Anhydride Equivalent | Adduct Ratio | Mol. Wt. | Polyalkylene Glycol Amine | Linkage Group |
|---|---|---|---|---|---|---|---|---|
| 13 | Ethylene/propylene/1,7-octadiene. | 25/25/1 | Maleic anhydride | | 70/1 | 150,000 | Methoxy polyethylene glycol (425 mol. wt.) amine. | Imide. |
| 14 | Dodecene/1,9-octadecadiene. | 1/1 | ...do... | | 4/1 | 700,000 | Polyethylene glycol (750 mol. wt.) amine. | Diamide. |
| 15 | Dodecene/1,9,12-octadecatriene. | 1/1 | ...do... | | 10/1 | 50,000 | Octadecoxypolyethylene glycol (220 mol. wt.) amine. | Mono (amine salt). |
| 16 | Propene/1-butene/1,6-octadiene. | 175/175/1 | ...do... | | 400/1 | 100,000 | Poly-1,2-heptylene glycol (25,000 mol. wt.) amine. | Di(amine salt). |
| 17 | Cracked wax olefins ($C_{11}$–$C_{15}$). | 92% α-olefin, 4% polyolefin. | Chloromaleic anhydride. | 2,500 | | 350,000 | Methoxy polyethylene glycol (350 mol. wt.) amine. | Imide. |
| 18 | Dodecene/1,9-octadecadiene. | 1/1 | Maleic anhydride | | 4/1 | 50,000 | Ethanolamine. | Do. | polyethylene glycol amine product of at least about 0.1% by weight based on the total composition.

In the lubricating oil compositions of this invention, the polyethylene glycol amine product is used with lubricating oil base in amounts sufficient to raise the viscosity index and/or improve the detergency of the base lubricating oil. Ordinarily, amounts of polyethylene glycol amine product of from about 0.1% to about 15% by weight are satisfactory for both of these purposes. In view of the excellent solubility characteristics of the polyethylene glycol amine products, a further feature of the invention lies in the preparation of lubricating oil concentrates containing higher percentages of polyethylene glycol amine products up to about 75%.

The base oil in the lubricant composition of the invention is any oil of lubricating viscosity. Thus, the base oil can be a refined paraffin-type base oil, a refined naphthenic-type base oil, or a synthetic hydrocarbon or synthetic nonhydrocarbon oil of lubricating viscosity. As synthetic oils, suitable examples include oils obtained by polymerization of lower molecular weight alkylene oxides, such as propylene oxide and/or ethylene oxide employing alcohol or acid initiators, such as lauryl alcohol or acetic acid. Still other synthetic oils include esters, e.g., di-(2-ethylhexyl)-sebacate, tricresylphosphate and silicate esters, such as tetra-(2-ethylhexyl)-orthosilicate and hexa-(2-ethylbutoxy)-disiloxane. For present purposes the mineral lubricating oils are preferred, since they show the greatest viscosity and stability improvement.

Lubricant compositions within the scope of the present invention may also contain still other additives of conventional types, such as pour point depressants, oiliness and extreme pressure agents, anti-oxidants, dyes, blooming agents and the like.

Illustrative lubricant compositions of the aforementioned types containing additives other than the polymeric additive may include, for example, from about 0.1 to about 10% by weight of alkaline earth metal, higher alkyl phenate detergent and wear reducing agents such as the calcium alkylphenate having mixed alkyl groups of 12 to 15 carbon atoms. They may also include from about 0.1 to 10% by weight of organic thiophosphate corrosion and high-temperature oxidation inhibitors, such As indicated above, other maleic adducting agents may be used in place of maleic anhydride. The following example illustrates the method of preparing maleic adduct using chloromaleic acid.

*Example 19*

60 g. of cracked wax olefin polymer as in Example 3 is dissolved in 150 g. of cetane and heated for 18 hours at 430° F. in the presence of 0.5 g. of bis(dibutylhydroxyphenyl)methane and 15 g. of chloromaleic anhydride. The reaction product is cooled under nitrogen, then precipitated four times with dry acetone, then dissolved in benzene. The reaction products show a very strong absorption band at 1760 cm.$^{-1}$ in the infrared spectroscope (this band corresponds to an anhydride group). The percent oxygen (by neutron oxidation analysis) is 1.91%, indicating an anhydride equivalent of 2510.

As already mentioned, the high molecular weight alkylene glycol amine products of this invention are useful in hydrocarbon fuels. In general, hydrocarbon base fuels customarily contain components such as cracked stocks which have a tendency to be unstable and thus form gum and deposits which clog filters and lines in fuel systems. Furnace oils, kerosenes, diesel fuel oils and jet fuels in particular contain substantial amounts of cracked gas oil stocks and form objectionable deposits during normal storage and operating conditions. The gum and deposit-forming tendencies of all such hydrocarbon base fuels are substantially eliminated by the addition of alkylene glycol amine reaction product.

I claim:
1. An oil-soluble polymeric dispersant consisting of a mixture of randomly distributed recurring component units having the fomula

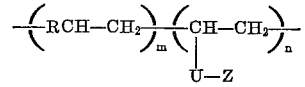

in which R is a member of the group consisting of hydrogen and aliphatic hydrocarbon radicals of from about 1 to about 18 carbon atoms and mixtures thereof, U is an unsaturated aliphatic hydrocarbon radical of from about 2 to about 18 carbon atoms and Z is a member of the group consisting of amine salts, amides and imides of the formulae

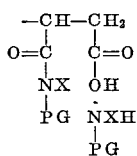

and

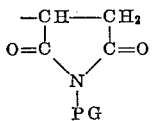

in which X is a member of the group consisting of hydrogen and PG, wherein PG is a member of the group consisting of polyalkylene glycols having at least 5 alkylene oxide units of from 2 to 7 carbon atoms for each unit, said polyalkylene glycol having a molecular weight of between about 220 and 30,000 and monoalkyl ethers and monoacetyl esters thereof wherein the monoalkyl group contains from 1 to 18 carbon atoms, the ratio of $m$ to $n$ being from about 1:1 to about 400:1, said polymeric dispersant having a molecular weight of from about 10,000 to about 1,000,000.

2. An oil-soluble polymeric dispersant consisting of a mixture of randomly distributed recurring component units having the formula

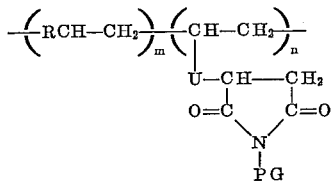

in which U represents an unsaturated aliphatic hydrocarbon radical of from about 4 to about 18 carbon atoms, PG represents a member of the group consisting of polyethylene glycols having a molecular weight of between about 220 and 30,000 and monoalkyl ethers and monoacetyl esters thereof, wherein the monoalkyl group contains from 1 to 18 carbon atoms and R is a member of the group consisting of hydrogen and an aliphatic hydrocarbon radical of from about 4 to about 18 carbon atoms, the ratio of $m$ to $n$ being from about 10:1 to about 100:1.

3. An oil-soluble polymeric dispersant in according with claim 1 in which the alkylene glycol amine is a methoxy polyethylene glycol primary amine.

4. An oil-soluble polymeric dispersant in accordance with claim 1 in which the alkylene glycol amine is acetyloxy polyethylene glycol primary amine.

5. A lubricating oil composition comprising a major proportion of an oil of lubricating viscosity and a minor proportion sufficient to improve the detergent characteristics of the polyalkylene glycol amine reaction product of claim 1.

6. A lubricating oil composition comprising a major proportion of an oil of lubricating viscosity and a minor proportion sufficient to improve the detergent characteristics of the polymeric dispersant of claim 3.

7. A lubricating oil composition comprising a major proportion of an oil of lubricating viscosity and a minor proportion sufficient to improve the detergent characteristics of the polymeric dispersant of claim 4.

8. A lubricating oil composition comprising a major proportion of an oil of lubricating viscosity and a minor proportion sufficient to improve the detergent characteristics of the polymeric dispersant of claim 2.

References Cited by the Examiner

UNITED STATES PATENTS

| | | | |
|---|---|---|---|
| 2,977,334 | 3/61 | Zopf et al. | 252—51.5 |
| 3,037,056 | 5/62 | Lowe et al. | 252—51.5 |
| 3,048,544 | 8/62 | Stewart et al. | 252—51.5 |

OTHER REFERENCES

Noller, Chemistry of Carbon Compounds, W. B. Saunders Co., Philadelphia, Pa.. (1951).

DANIEL E. WYMAN, *Primary Examiner.*

UNITED STATES PATENT OFFICE
CERTIFICATE OF CORRECTION

Patent No. 3,216,941                      November 9, 1965

Louis de Vries

It is hereby certified that error appears in the above numbered patent requiring correction and that the said Letters Patent should read as corrected below.

Column 8, line 38, for "15 min./kg." read -- 15 mM./kg. --; line 54, for "0.10" read -- 0-10 --; column 12, line 8, for "according" read -- accordance --.

Signed and sealed this 20th day of September 1966.

(SEAL)
Attest:

ERNEST W. SWIDER                      EDWARD J. BRENNER
Attesting Officer                        Commissioner of Patents